(12) United States Patent
Pond et al.

(10) Patent No.: US 8,811,801 B2
(45) Date of Patent: Aug. 19, 2014

(54) CONTINUOUS FREEZE-FRAME VIDEO EFFECT SYSTEM AND METHOD

(75) Inventors: Christopher Pond, Orlando, FL (US); David Casamona, Orlando, FL (US); Anthony Bailey, Wallingford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 1086 days.

(21) Appl. No.: 12/731,284

(22) Filed: Mar. 25, 2010

(65) Prior Publication Data
US 2011/0235998 A1 Sep. 29, 2011

(51) Int. Cl.
*G11B 27/00* (2006.01)

(52) U.S. Cl.
USPC ........... 386/280; 386/278; 715/719; 715/723; 715/726

(58) Field of Classification Search
USPC .......... 386/278–283, 287, 288; 707/723, 726; 725/23, 135; 715/721, 723, 719, 720, 715/722, 726; 345/419, 420, 473, 474; 434/247–254
See application file for complete search history.

(56) References Cited

U.S. PATENT DOCUMENTS

| | | | |
|---|---|---|---|
| 4,809,117 A | 2/1989 | Friedman | |
| 5,923,365 A | 7/1999 | Tamir et al. | |
| 6,873,327 B1* | 3/2005 | Edwards et al. | 345/473 |
| 6,988,244 B1* | 1/2006 | Honda et al. | 715/721 |
| 7,609,271 B2* | 10/2009 | Lin et al. | 345/474 |
| 7,990,385 B2* | 8/2011 | Kake et al. | 345/473 |
| 7,996,878 B1* | 8/2011 | Basso et al. | 725/135 |
| 8,020,098 B2* | 9/2011 | Katayama | 715/720 |

(Continued)

FOREIGN PATENT DOCUMENTS

WO 9901830 1/1999

OTHER PUBLICATIONS

Wilson, Barry D., "Development in Video Technology for Coaching," Sports Technology, Jun. 25, 2008, abstract printed from Internet on Mar. 2, 2010 <http://www3.interscience.wiley.com/journal/120195077/abstract>.

(Continued)

*Primary Examiner* — Hung Dang
*Assistant Examiner* — Mishawn Dunn
(74) *Attorney, Agent, or Firm* — Fay Kaplun & Marcin, LLP

(57) ABSTRACT

A number of adjacent regions in input video and a corresponding number of adjacent regions in output video are defined. The adjacent regions are defined so that they span the path of motion of a subject as it moves across a scene in the input and output video. For each region, a plurality of sequential region frames defining video within the region are captured. For each region, playback of the captured plurality of sequential region frames is provided in a substantially continuous loop. The playback of the captured plurality of sequential frames defining video within each region is positioned in the output video adjacent the playback of the captured plurality of sequential frames defining video within an adjacent region in the output video so that the combined effect of the adjacent regions of played-back video is to provide output video that spans the scene.

20 Claims, 17 Drawing Sheets

(56) References Cited

U.S. PATENT DOCUMENTS

| | | | |
|---|---|---|---|
| 2002/0064764 A1* | 5/2002 | Fishman et al. | 434/252 |
| 2002/0115046 A1* | 8/2002 | McNitt et al. | 434/252 |
| 2005/0086027 A1* | 4/2005 | Li | 702/181 |
| 2005/0237326 A1* | 10/2005 | Kuhne | 345/506 |
| 2006/0239563 A1* | 10/2006 | Chebil et al. | 382/232 |
| 2007/0270214 A1 | 11/2007 | Bentley | |
| 2008/0090679 A1 | 4/2008 | Browne et al. | |
| 2009/0087161 A1* | 4/2009 | Roberts et al. | 386/66 |
| 2010/0158099 A1* | 6/2010 | Kalva et al. | 375/240.01 |
| 2011/0093492 A1* | 4/2011 | Sull et al. | 707/769 |
| 2011/0289413 A1* | 11/2011 | Ubillos et al. | 715/723 |
| 2012/0063646 A1* | 3/2012 | Lu | 382/107 |

OTHER PUBLICATIONS

Seaside Software, "SportsCAD Motion Analysis," printed from Internet on Mar. 2, 2010 <http://www.sportscad.com/Analysis-Basics.html>.

Action Plus Video, "Sports Motion Analysis Software," printed from Internet on Mar. 2, 2010 <http://actionplusvideo.com/Fastpitch-Hitting-Analysis/fastpitch-hitting-analysis.htm>.

Centra, "An Analysis of the Co-Evolution of Sports and Media," Boston College, Apr. 2003, printed from Internet on Mar. 2, 2010 <http://dissertations.bc.edu/ashonors/200306>.

* cited by examiner

CONTINUOUS FREEZE-FRAME VIDEO EFFECT SYSTEM AND METHOD

BACKGROUND

A "video effect" is an enhancement to raw video footage, typically added post-production, for the purpose of adding artistic or informational interest to the footage. Examples of well known video effects include fades, dissolves, wipes, superimpositions, morphs, slow motion, fast motion and freeze-frame.

Video effects can be applied to any type of video imagery. An example of a type of video imagery to which effects are commonly applied is sports footage. For example, a slow motion effect can be added to raw footage of a sporting event to slow down the appearance of movement of an athlete on a playing field.

Effects can be added during the process of editing the video footage on an editing station. Although editing stations having specialized hardware are known, many of the video editing stations used by professional video production personnel are essentially personal computers programmed to digitally manipulate video stored on disk or similar data storage. The operator of the editing station interacts with it via a keyboard, mouse, display, and other such common user interface elements. The display (screen) allows the operator to view the raw (input) video, any intermediate results, and the resulting output video. The operator can, for example, cause the editing station to play back the video in a frame-by-frame manner on the display and apply effects at certain points, i.e., to certain frames or sequences of frames. For example, the operator can apply a freeze-frame effect, which replaces a single input video frame with multiple copies so that, when the resulting output video is played back, the frame lingers on the display for a desired time period. The operator can copy the output video to a suitable digital storage medium or transmit the output video to a remote site via a data network.

SUMMARY

Embodiments of the present invention relate to a digital video effect in which input video depicting a subject, such as a person or object, in motion across a scene is transformed into output video depicting a plurality of iterations or "clones" of the subject simultaneously in motion across the scene. The subject appears as though it has been cloned or copied, with each successive clone following a preceding clone along a path of motion across the scene.

In accordance with the above-described effect, a plurality of adjacent regions in input video and a corresponding plurality of adjacent regions in output video are defined. The adjacent regions are defined so that they span the path of motion of the subject across the scene. For each region, a plurality of sequential region frames defining video within the region are captured. For each region, playback of the captured plurality of sequential region frames is provided in a substantially continuous loop. The playback can be provided by, for example, a digital video effects device, such as a suitably programmed computer, generating an output video file for later use, by a digital video effects device playing back data in essentially real-time as it is being read from the device's memory or other source, or by any other suitable means. The playback of the captured plurality of sequential frames defining video within each region is positioned in the output video adjacent the playback of the captured plurality of sequential frames defining video within an adjacent region in the output video, so that the combined effect of the adjacent or adjoining regions of played-back video is to provide output video that spans the scene across which the clones appear to move.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
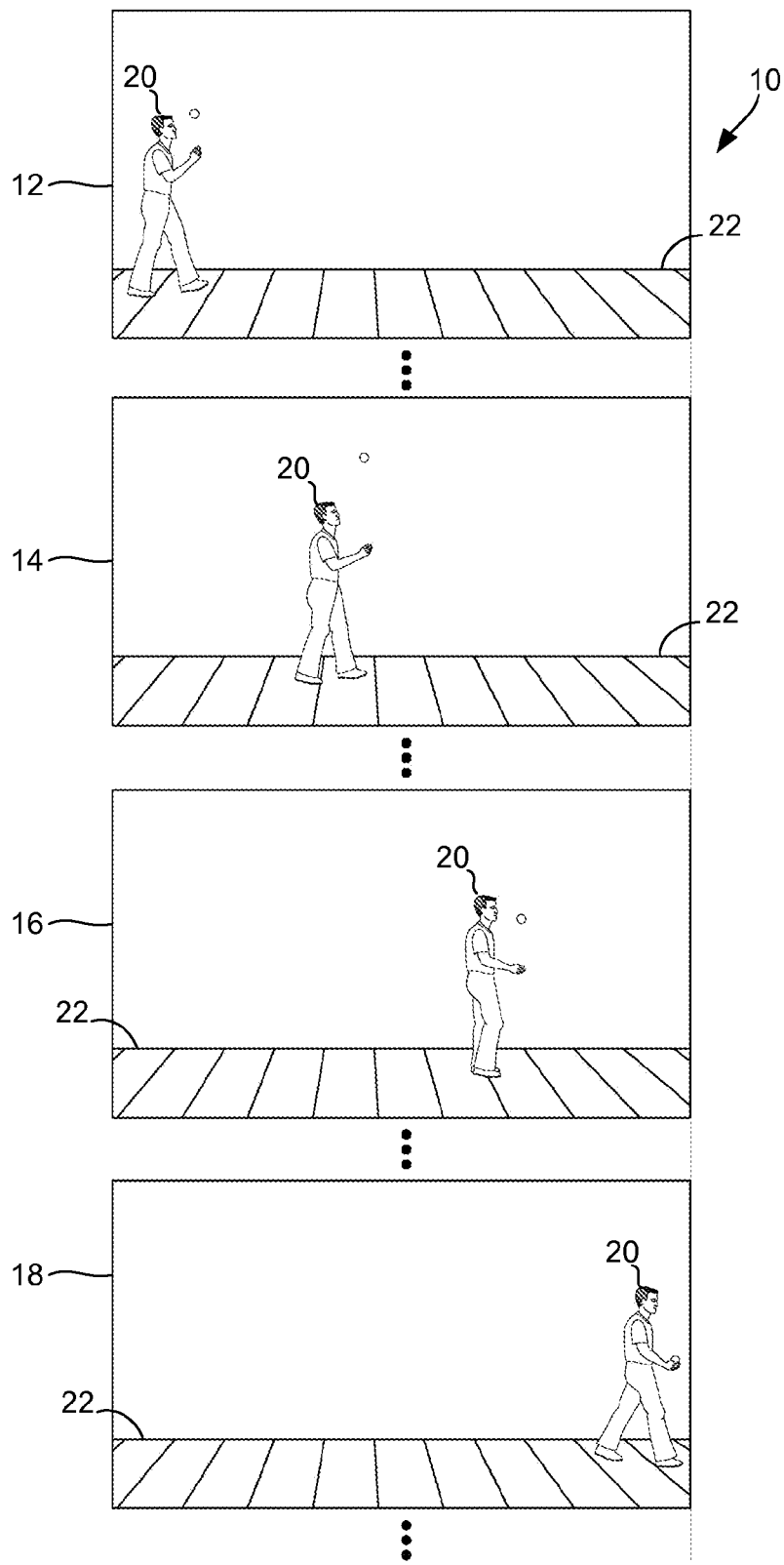
FIG. 1 illustrates several exemplary frames of input video, depicting an exemplary subject moving across a scene.

As illustrated in FIG. 1, in an illustrative or exemplary embodiment of the invention, input video 10 includes four exemplary frames 12, 14, 16 and 18. The term "video" as used herein refers broadly to information in an electronic format that defines a moving image. Video is typically described in terms of a sequence of frames, where each frame can be exposed to a viewer's eyes (by, for example, displaying it on an electronic video display) for a fraction of a second, such that the effect of sequentially displaying the frames is the viewer's perception of movement of what is depicted in the video. In the example shown in FIG. 1, frames 12, 14, 16 and 18 of input video 10 depict a subject (person) 20 walking across an exemplary backdrop or background 22. Frames 12, 14, 16 and 18 define a time sequence of frames: frame 14 depicts subject 20 at a later time than frame 12; frame 16 depicts subject 20 at a later time than frame 14; and frame 18 depicts subject 20 at a later time than frame 18. The combination of subject 20 and background 22 or whatever else may be depicted in input video 10 defines a scene. In the example shown in FIG. 1, subject 20 walks across the scene. Background 22 is of no relevance and is depicted in FIG. 1 only to provide a general sense of the rate at which subject 20 is moving across the scene. In this regard, it can be noted that the exemplary input video 10 depicts subject 20 walking across background 22 while tossing a ball in his right hand. Although FIG. 1 is not to scale, for purposes of appreciating the description herein it may be useful to consider that, at typical video frame rates of, for example, 30 or 60 frames per second, and with subject 20 moving at a pace at which a person typically walks, frames 12, 14, 16 and 18 can be separated from one another by a time interval on the order of, for example, half a second. Accordingly, input video 10 includes additional or intermediate frames between and among frames 12, 14, 16 and 18 that are not shown in FIG. 1 for purposes of clarity but which are indicated by the ellipsis (" . . . ") symbol. For example, input video 10 can consist of, for example, several hundred or several thousand such frames, representing several seconds or minutes of movement of subject 20. A short segment (e.g., on the order or seconds or minutes) of video is sometimes referred to as a "video clip." In instances in which a video clip depicts subject matter relating to a news story, athletic event, etc., such a video clip is sometimes referred to as "footage." The manner in which digital video can be recorded or otherwise captured using video cameras or other video equipment is well understood in the art and therefore not described herein.

Although the subject matter of input video 10 is essentially irrelevant to the present invention, it should be noted that the subject matter includes a clearly discernible subject moving along a path of motion (i.e., a subject that can be clearly differentiated from the background or other scene elements through which the subject is depicted moving). In the example illustrated in FIG. 1, for purposes of clarity subject 20 is depicted moving in an essentially straight line from left to right across background 22. However, the invention is applicable to instances in which such a subject moves along essentially any path, whether straight or curved, in any direction. For example, suitable input video can depict an athlete running around a track or field, a bicyclist or motorcyclist riding around a course, a skateboarder performing stunts in a skatepark, a ball in flight, etc. Many more examples of suitable input video will occur to those skilled in the art in view of the descriptions herein.

Figure 9:
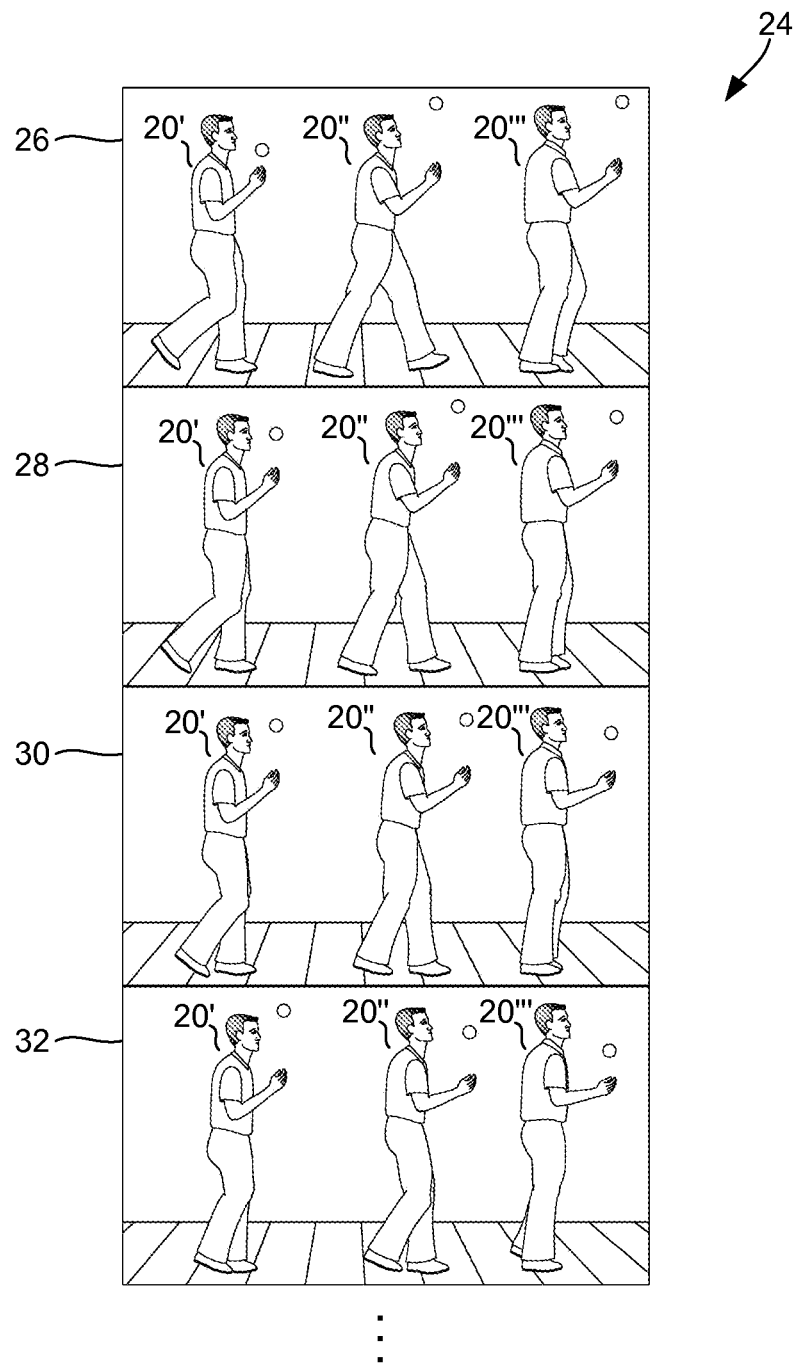
FIG. 9 is similar to FIG. 8, depicting the resulting effect in which "clones" of the exemplary subject appear to move across the scene in the output video.

In accordance with the present invention as described below in further detail, the exemplary input video 10 can be transformed into the output video 24 that is shown in FIG. 9. The transformation can alternatively be described as applying a video effect to input video 10. For convenience of reference, the video effect can be referred to as "continuous freeze frame." As depicted in the sequence of four exemplary frames 26, 28, 30 and 32 of output video 24, the video effect provides the appearance of several iterations or clones 20', 20" and 20''', of subject 20 simultaneously in motion across background 22. That is, each of frames 26, 28, 30 and 32 includes multiple clones of subject 20. Note that at each point in time represented by one of frames 26, 28, 30 and 32, each clone depicts subject 20 in a position that subject 20 occupied in input video 10 (FIG. 1) at some point in time. Clones appear to follow each other along the path of motion of subject 20, moving in unison. (For purposes of emphasis, the rate at which clones 20', 20" and 20''' appear to move from one frame to the next may appear exaggerated in FIG. 9, and it should be understood that none of the drawings figures is to scale.) In the illustrated example, in which subject 20 is a human figure (person), each of clones 20', 20" and 20''' depicted in output video 24 moves in exactly the same manner as the original subject 20 moves in input video 10, with every point on a given clone's body positioned (e.g., with respect to background 22) in the frame of output video 24 exactly as that point on the original subject 20 is positioned (e.g., with respect to background 22) in a frame of input video 10. For example, as subject 20 walks across background 22 in input video 10, the right arm swings up and down as the person (subject 20) tosses the ball, and at each moment in time a given point on the person, such as the person's fingertip, is at a given location with respect to background 22 in input video 10. Correspondingly in output video 24, as each clone approaches that location, the clone's corresponding fingertip will be at the same location with respect to background 22 as in input video 10. As FIGS. 1 and 9 are intended only as examples, this correspondence is not depicted with exactitude in a comparison between FIGS. 1 and 9.

Figure 2:
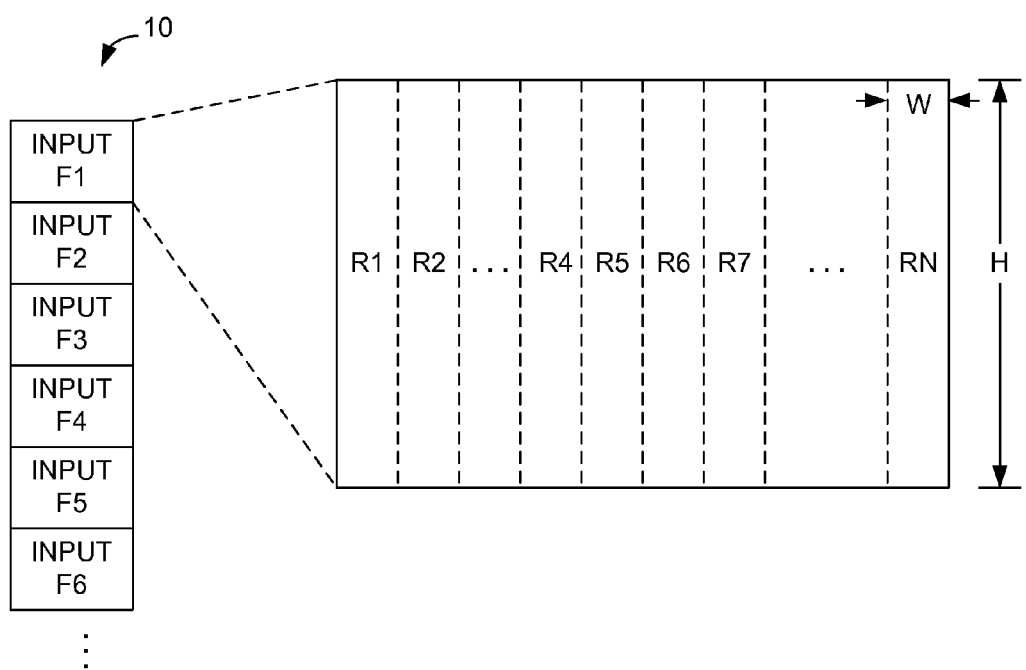
FIG. 2 illustrates regions defined in the input video of FIG. 1, in accordance with an exemplary embodiment of the invention.

A method for providing the above-described "continuous freeze-frame" digital video effect can be understood with reference to FIG. 2-8. As illustrated in FIG. 2, a number N (where N is greater than one) of regions R1 through RN are defined for frames of input video 10. Although an exemplary manner in which region size can be selected and regions can otherwise be defined is described in further detail below, it can be noted generally that each region has a rectangular or bar-like shape, with a width (W) and a height (H) relative to the width and height of frames of input video 10. Regions R1 through RN are contiguous and span the width of each frame of input video 10. That is, region R1 is adjacent and borders or adjoins region R2, region R2 is adjacent and borders or adjoins region R3, etc. Although for purposes of clarity only one exemplary frame F1 is shown as having regions R1 through RN defined, the regions are correspondingly defined for all frames of input video 10. Again, the manner in which regions are defined is described below in further detail.

Figure 3:
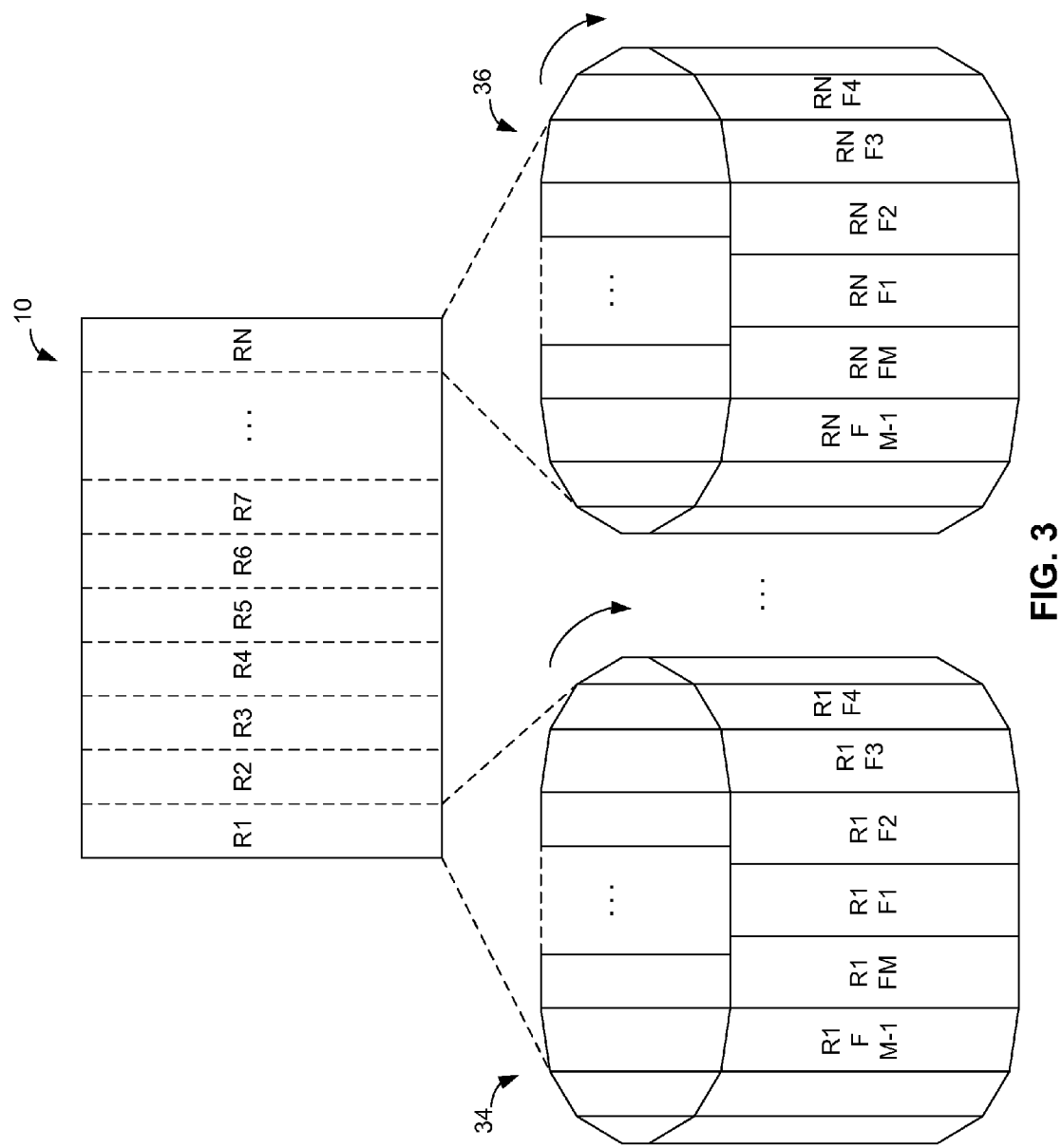
FIG. 3 illustrates region frames captured in the input video of FIG. 1, in accordance with the exemplary embodiment of the invention.

As illustrated in FIG. 3, for each of regions R1 through RN, a number M (where M is greater than one) of region-sized portions of sequential frames of input video 10 are captured. That is, for region R1, region-sized portions of sequential frames R1F1 through R1FM of input video 10 are captured; for region R2, region-sized portions of sequential frames R2F1 through R2FM of input video 10 are captured; and so forth, through region RN, for which region-sized portions of sequential frames RNF1 through RNFM of input video 10 are captured. For example, region-sized portions of 50 frames (i.e., in an example in which M=50) of input video 10 can be captured for each of regions R1 through RN. The captured region-sized portions of input video frames can be referred to for convenience as region frames to distinguish them from input video frames. The term "capture" in this regard refers to digitally copying video data from input video 10 to storage locations or otherwise obtaining the video data from input video 10 for processing, as described in further detail below. As the captured region frames for a given region are sequential, they define video, i.e., a moving image, confined within that region.

A form of continuous-loop playback is provided for the video defined by the captured region frames for each of regions R1 through RN. A continuous-loop sequence 34 of captured region frames R1F1 through R1FM is defined for region R1, another continuous-loop sequence (not shown in FIG. 3) of captured region frames R2F1 through R2FM is defined for region R2, and so forth, through region RN, for which a continuous-loop sequence 36 of captured region frames RNF1 through RNFM is defined. Sequences 34, 36, etc., of captured region frames can be digitally stored in a manner that facilitates their playback in a substantially continuous loop, as described in further detail below. However, although exemplary sequences 34, 36, etc., are conceptually depicted in FIGS. 3-5 as having loop-like forms, sequences, 34, 36, etc., can be stored in any suitable digital format and arrangement; nothing resembling a loop need physically exist in any data storage medium for playback to be provided in a continuous loop. As persons skilled in the art understand, techniques relating to memory addressing can be used to effect the method of operation described herein.

Figure 4:
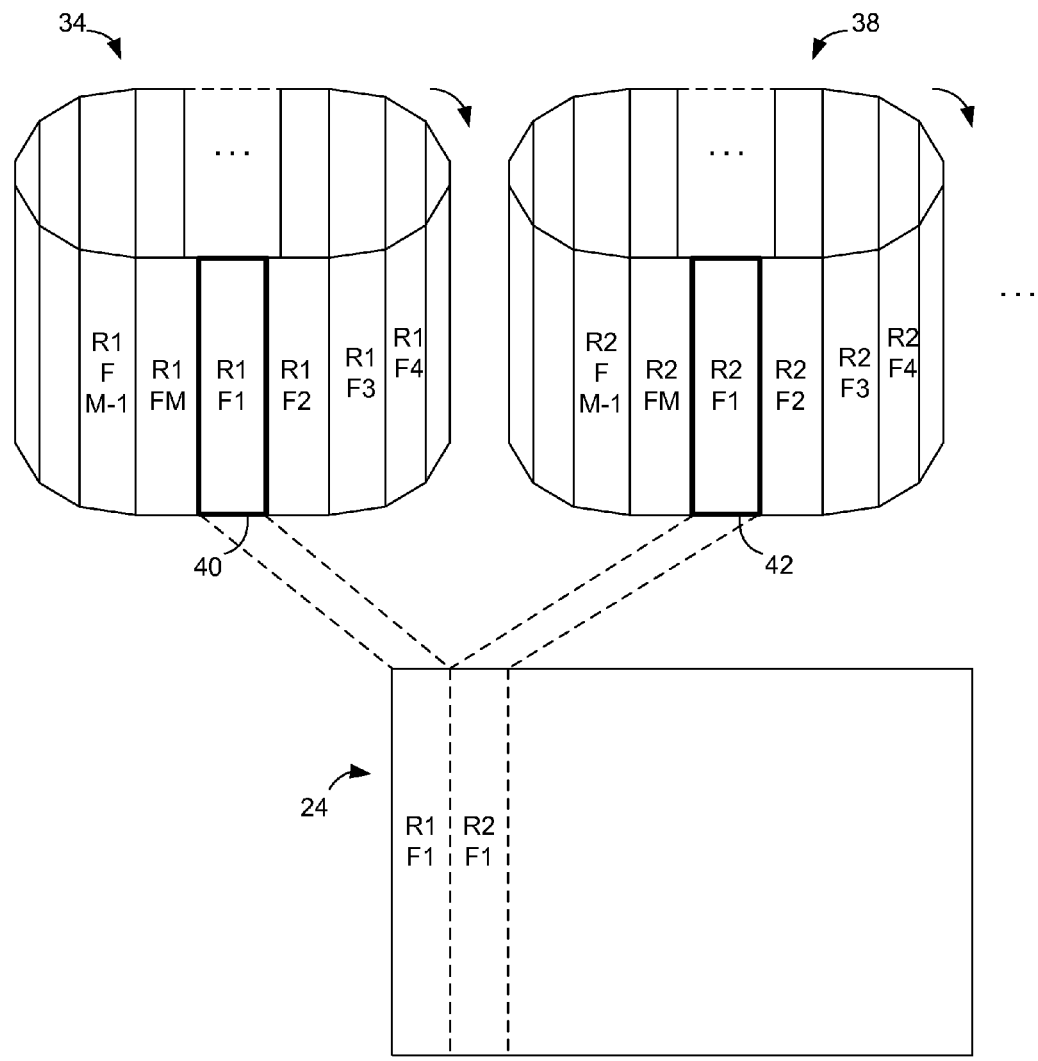
FIG. 4 illustrates playback of captured region frames in output video, in accordance with the exemplary embodiment of the invention.
Figure 5:
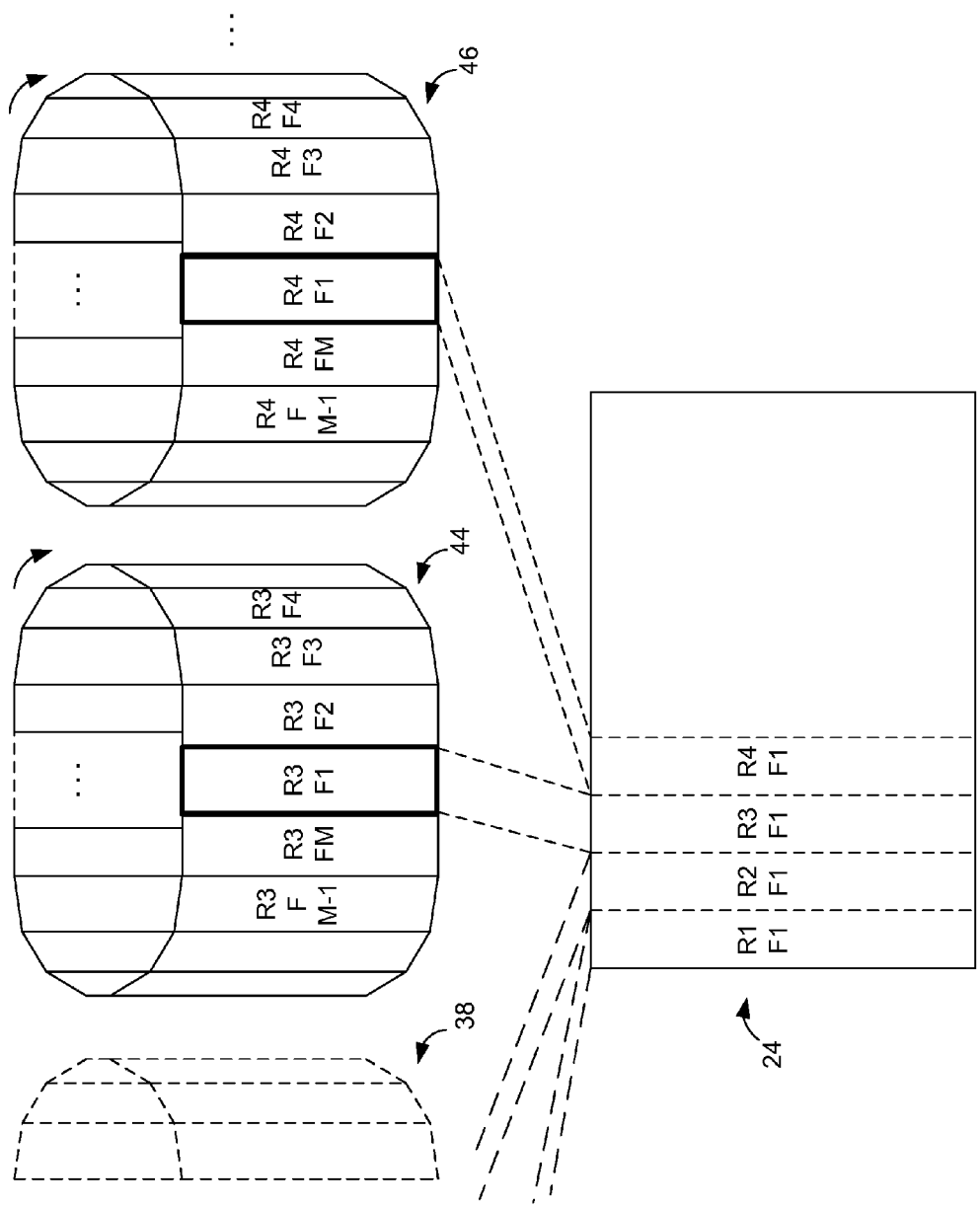
FIG. 5 is similar to FIG. 4, illustrating playback of adjacent regions, in accordance with the exemplary embodiment of the invention.

As well understood in the art, the term "playback" or "playing back" refers to a process of causing video (data) to be transformed into a form in which it can be viewed by a human, such as by transforming the video into a moving image on a display (not shown in FIGS. 3-5). For example, video frames stored in bitmap format can be transformed by displaying pixels on a display screen at locations corresponding to bits in the frames. To "provide playback" for sequences 34, 36, etc., means that the video (data) is readied for playback. For example, as described in further detail below, playback can be provided by arranging and storing the frames of sequences 34, 36, etc. on a digital storage medium in preparation for later playback or, alternatively, by playing back the frames of sequences 34, 36, etc., directly from input video 10 or from an intermediate storage medium, or in any other suitable manner that provides substantially continuous-loop playback for the captured sequences 34, 36, etc., of frames. The term "substantially" in this regard refers to the fact that the looping playback can be intermittent or interrupted (e.g., by an operator, or as a result of other events) or interleaved with other playback or events.

As illustrated in FIG. 4, the playback of the captured region frames defining video within a given region is positioned in the frame of output video 24 adjacent the playback of the captured region frames defining video within an adjacent region. For example, in FIG. 4 continuous-loop playback of captured sequence 34, comprising region frames R1F1 through R1FM, is shown in a region (R1) at the leftmost side of a frame of output video 24, and continuous-loop playback of captured sequence 38, comprising region frames R2F1 through R2FM, is shown in a region (R2) positioned immediately to the right of the region (R1) in which playback of captured sequence 34 is provided. The conceptual looping of captured sequences 34 and 38 is indicated by the curved arrows. Conceptually, captured sequences 34 and 38 can be considered to rotate frame-by-frame around in a loop in the direction of the curved arrows, with each successive region frame ($R_nF_m$) for an nth region and mth frame (where n is a number from 1 and N, and m is a number from 1 to M) reaching an output window 40, 42, etc. Alternatively, output windows 40, 42, etc. can be conceptually considered to move from one region frame to the next, around captured sequences 34 and 38. It should be understood that the appearance of looping or rotation is conceptual rather than physical, and is the result of physical data manipulation such as reading data from, for example, incrementally increasing memory addresses. The manner in which captured region frames (data) can be manipulated (e.g., in memory) to provide such an effect of looping or rotation is well understood in the art and therefore not described herein in detail.

Figure 6:
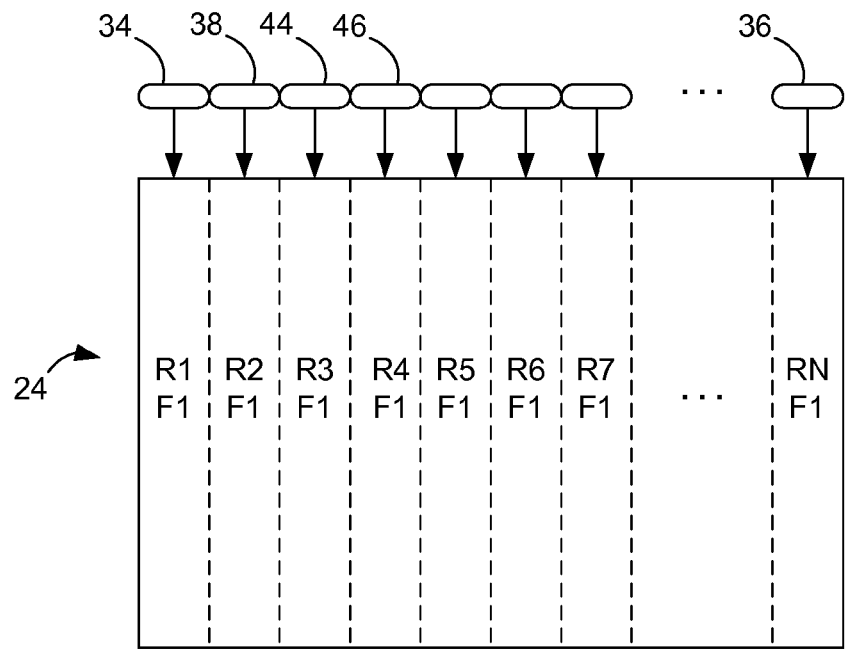
FIG. 6 illustrates playback of captured sequential region frames defining video within the adjacent regions in the output video, in accordance with the exemplary embodiment of the invention.
Figure 7:
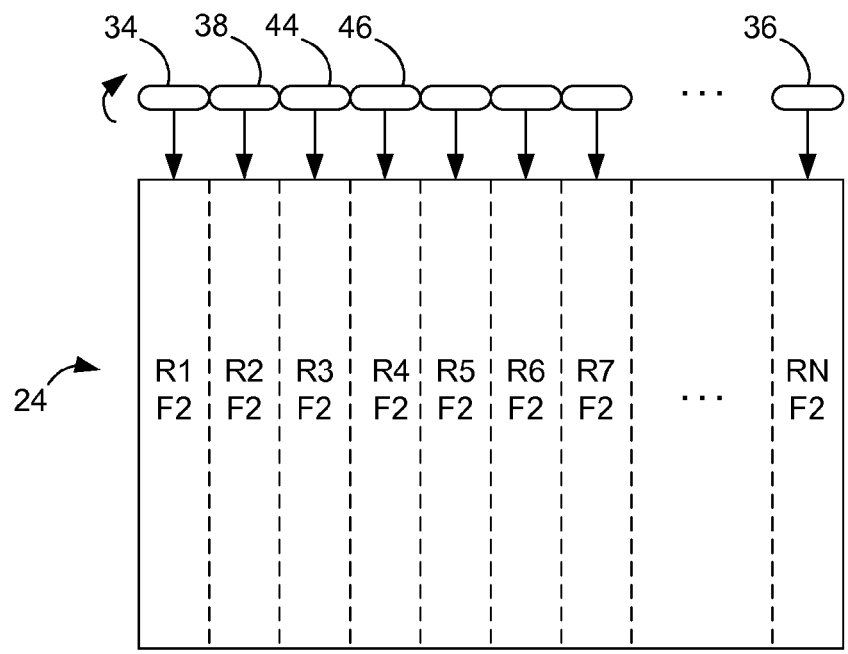
FIG. 7 is similar to FIG. 6, further illustrating the playback of sequential output video frames, in accordance with the exemplary embodiment of the invention.

As illustrated in FIGS. 5-7, the positioning of the playback of video for each region continues so that such playback is provided in each of regions R1 through RN of output video 24. For example, in FIG. 5 playback of captured sequence 44, comprising region frames R3F1 through R3FM, is shown in a region (R3) positioned immediately to the right of the region (R2) in which playback of captured sequence 38 is shown, and playback of captured sequence 46, comprising region frames R4F1 through R4FM, is shown in a region (R4) positioned immediately to the right of the region (R3) in which captured sequence 44 is playing back, etc. Although the order in which FIGS. 4 and 5 are described herein may appear to indicate that the playback of video for adjacent regions is provided or initiated successively, e.g., left to right, with playback of a captured sequence comprising region frames $R_nF_m$ through $R_nF_M$ being provided in a region $R_n$ after playback of a captured sequence comprising region frames $R_{n-1}F_m$ through $R_{n-1}F_M$ is provided, it should be understood that the playback of regions R1 through RN can be provided or initiated in any order, including simultaneously. Similarly, although the regions in this exemplary embodiment are numbered from left to right, beginning with region "R1" at the leftmost side of an output video frame and ending with region "RN" at the rightmost side of an output video frame, this numbering is provided only for illustrative purposes, and in other embodiments the frames can be numbered or otherwise identified in any other suitable manner. Persons skilled in the art can appreciate that digital representations of input and output video frames, region frames, captured sequences, and other data items can be identified and manipulated in software using any of various well known techniques.

The result of providing playback for each of regions R1 through RN in output video 24 is shown in FIG. 6. Note in FIG. 6 that the playback provided for regions R1 through RN spans the width of the frame of output video 24. That is, the playback in adjacent regions forms a seamless (borderless) mosaic that fills the frame of output video 24. As shown in FIG. 9, borders between adjacent regions are not normally visible in output video 24 when played back for a person to view. It should be noted that the broken line representing the region borders in FIGS. 2-8 is shown for reference purposes and does not necessarily represent anything that is displayed when output video 24 is played back for a person to view.

Note that providing playback for each of regions R1 through RN in output video 24 comprises providing continuous-loop playback for all of the captured sequences of region frames as each successive frame in the sequence of output video frames is generated. A first (m=1) frame of output video 24 is shown in FIG. 6, and a second (m=2) frame of output video 24 is shown in FIG. 7. Accordingly, after an $m^{th}$ frame of output video 24 is provided with playback of region frames $R1F_m$ through $RNF_m$ that span the output video frame, the next or $(m+1)^{th}$ output video frame is similarly provided with playback of region frames $R1F_{m+1}$ through $RNF_{m+1}$ that similarly span that next or $(m+1)^{th}$ output video frame, and so forth, through the frame of output video 24 that is provided with playback of region frames R1FM through RNFM. When a frame of output video 24 has been provided with playback of region frames R1FM through RNFM, the playback provided for each region loops back to begin again at the first region frame in the loop (i.e., m=1). That is, the next output video frame is provided with playback of region frames $R1F_1$ through $RNF_1$. In an example in which each captured sequence of region frames consists of 50 frames (i.e., M=50), after 50 such frames of output video 24 are generated using the playback provided by the 50-frame sequence of region frames for each region, the next 50 frames of output video 24 are generated using the same 50-frame sequence of region frames for each region, and so on.

Figure 8:
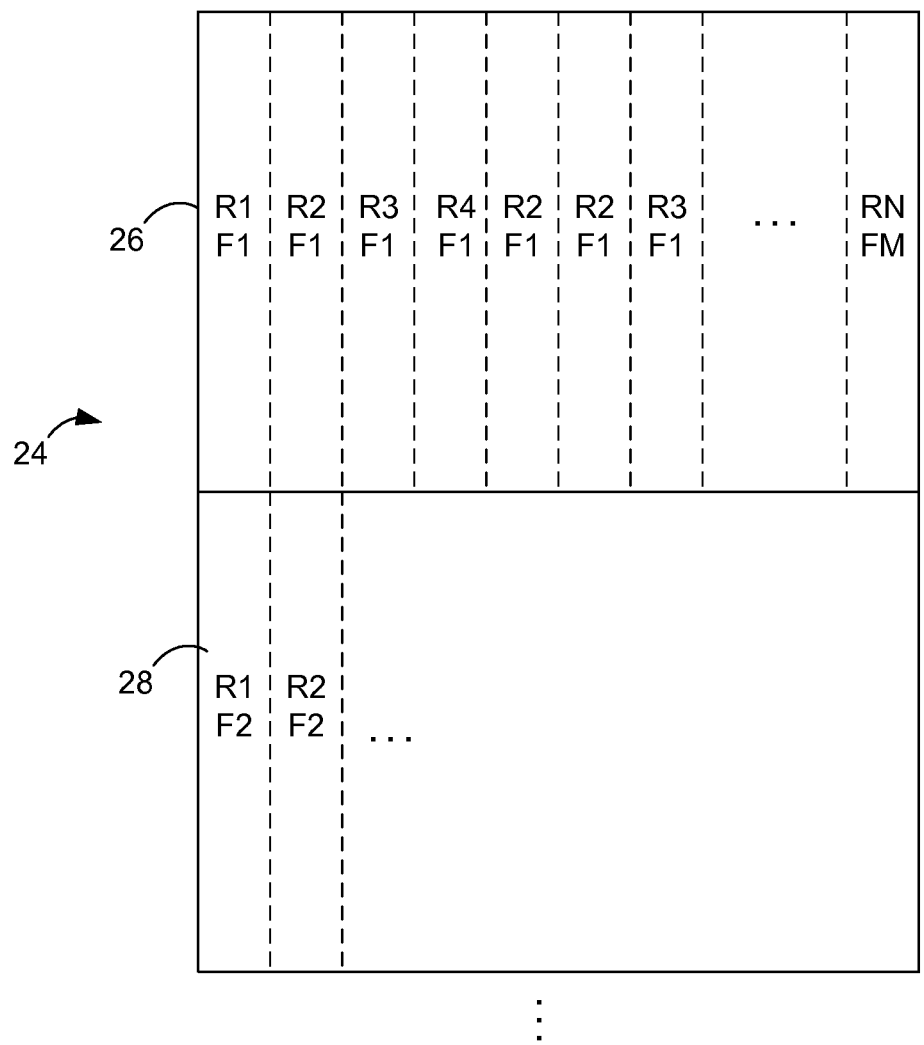
FIG. 8 illustrates several exemplary frames of output video, in accordance with the exemplary embodiment of the invention.

A comparison of a few exemplary frames 26 and 28 of output video 24 shown in FIG. 8 with the same frames of output video 24 shown in FIG. 9 illustrates that the adjacent playback regions (see FIG. 8) in output video 24 cannot be perceived by a person viewing output video 24 (see FIG. 9), and that the person only perceives the effect of multiple iterations or clones of subject 20 in motion across the scene.

Figure 10:
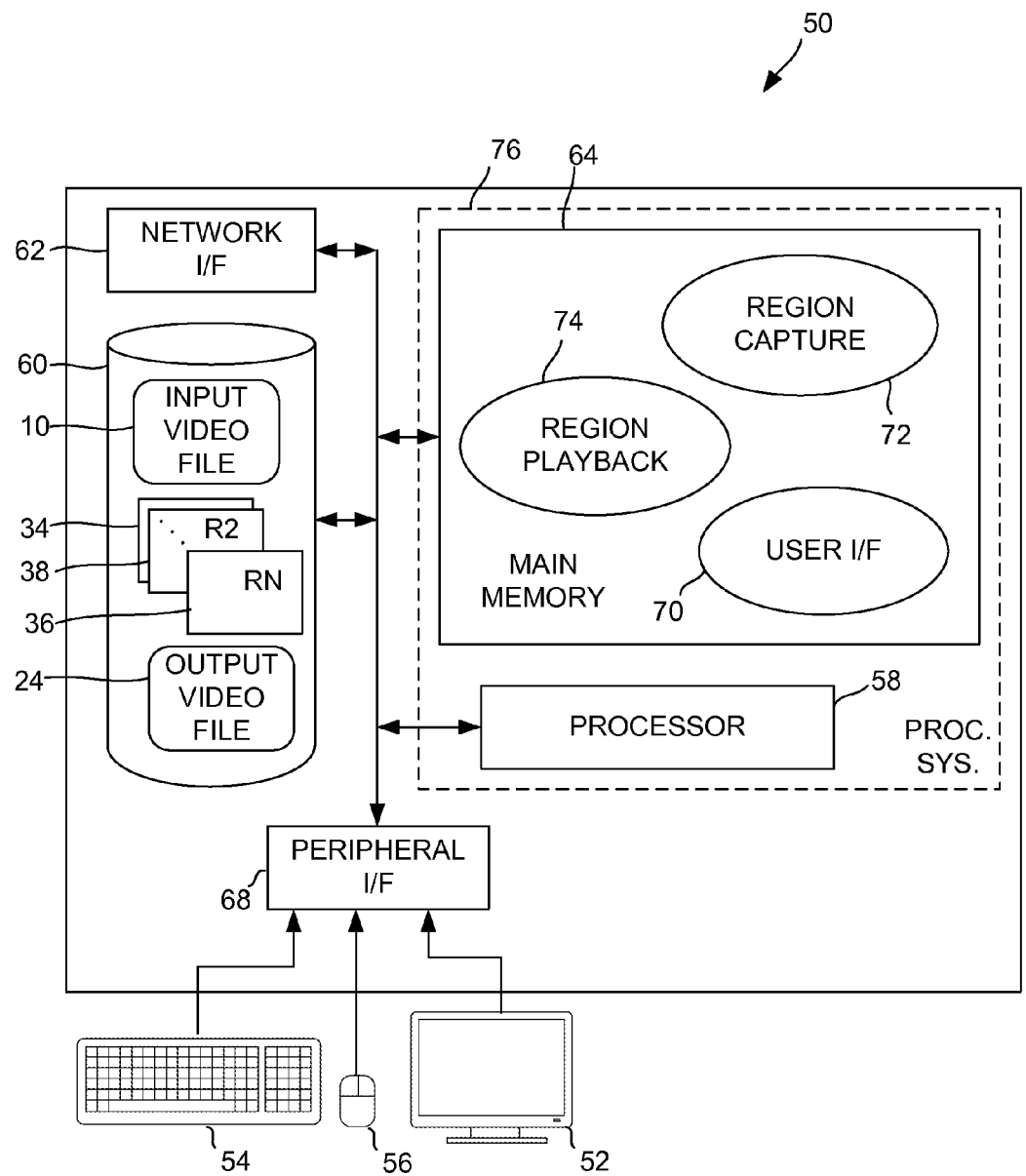
FIG. 10 is a block diagram of a programmed digital video effects device, in accordance with the exemplary embodiment of the invention.

As illustrated in FIG. 10, the above-described method for providing a "continuous freeze-frame" digital video effect can be performed on a suitable digital video effects device 50. In the exemplary embodiment, digital video effects device 50 can essentially be a personal computer system that has been suitably programmed or otherwise configured, as described below.

Digital video effects device 50 can include, for example, user interface devices such as a display screen 52, a keyboard 54, and a mouse 56, as well as processing elements such as one or more processors 58, data storage devices 60, network interfaces 62, and memory 64. These elements communicate with one another via a digital bus 66. The user interface devices and similar external devices can be coupled to digital bus 66 via a peripheral interface 68, such as a Universal Serial Bus interface. Memory 64 is generally of a type in which software elements, such as data and programming code, are operated upon by processor 58. In accordance with conventional computing principles, processor 58 operates under the control of programming code, such as operating system code and application program code. In the exemplary embodiment of the invention, such application program code can include the following software elements: a user interface element 70, a region capture element 72, and a region playback element 74. Although these software elements are conceptually shown for purposes of illustration as stored or residing in memory 64, persons skilled in the art to which the invention relates can appreciate that such software elements may not reside simultaneously or in their entireties in memory 64 but rather may be retrieved in portions on an as-needed basis, e.g., in code segments, files, modules, objects, data structures, instruction-by-instruction, or any other suitable basis, from data storage 60 or other suitable source (e.g., via a data network coupled to network interfaces 62). Note that although only region capture element 72 and region playback element 74 are shown for purposes of clarity, other software elements of the types conventionally included in computers systems that enable them to operate properly is generally included, such as operating system software. Similarly, other hardware elements of the types conventionally included in computer systems can be included.

It should be noted that, as programmed or otherwise configured in accordance with the above-described software elements, the combination of processor 58, memory 64 (or other element or elements in which software is stored or resides) and any related elements generally defines a programmed processor system 76. It should also be noted that the combination of software elements and the medium on which they are stored or in which they reside (e.g., memory 64, data storage 60, one or more removable or portable disks (not shown), etc.) generally constitutes what is referred to in the patent lexicon as a "computer program product."

Input video 10, described above, can be stored in data storage 60 or other suitable data storage medium in the form of a data file. Likewise, output video 24 can be stored in data storage 60 or other suitable data storage medium in the form of another data file. In some embodiments the process or method of generating the digital video effect, i.e., transforming input video 10 into output video 24, can give rise to one or more intermediate or temporary data files (not shown), which can be stored in data storage 60, memory 64, or other suitable location. As persons skilled in the art to which the invention relates can appreciate, any of the above-described software elements, including data files, can be stored in any suitable format in any suitable location or combination of locations, in whole or part, and are only conceptually shown in FIG. 10 for purposes of illustration.

In the exemplary embodiment, a method for generating the digital video effect can be initiated by a person (user) operating digital video effects device 50. In operation, and in accordance with the effects of software elements that can include user interface element 70 (FIG. 10), digital video effects device 50 can provide a window-based graphical user interface (GUI). The GUI can provide screen displays along the lines of those shown in FIGS. 11A-11G that digital video effects device 50 outputs on display 52. The user can interact with these screen displays in accordance with well-understood GUI principles, such as by using mouse 56 to "click on," "drag," and otherwise interact with buttons, scroll bars or other graphical controls.

Figure 11A:
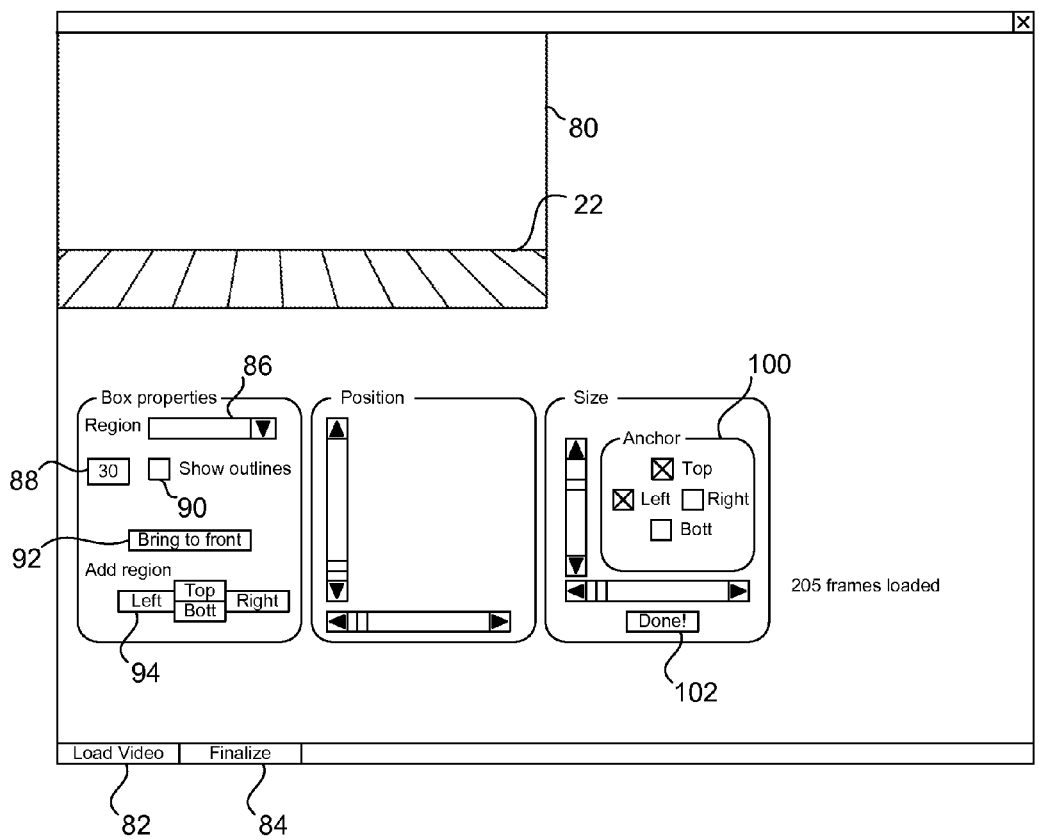
FIG. 11A illustrates an exemplary screen, showing a first step of an exemplary method of operation of the invention.

As illustrated in FIG. 11A, the GUI can include, for example, a video box 80, a Load Video button 82, a Finalize button 84, a Region Number box 86, a region frame count box 88, a Show Outlines checkbox 90, a Bring to Front button 92, four Add Region buttons 94, region Position scrollbars 96, region Size scrollbars 98, region Anchor checkboxes 100, and a Done button 102. The GUI and related functions of digital video effects device 50 described herein are intended only to be exemplary, and additional or different functions can be included in other embodiments. For example, in other embodiments additional functions (and attendant software elements) can be included to control how the input video is obtained or processed (e.g., from alternate sources, such as from a live video feed), to control playback, to control how the output video is stored, routed, processed, etc. In addition, in other embodiments a digital video effects device can provide other functions, such as generating digital video effects in addition to the continuous freeze-frame effect described herein. In such other embodiments, features of the GUI described herein and other features of digital video effects device 50 can be combined with features relating to generating such other digital video effects. For example, the continuous freeze-frame effect described herein can be included in a menu of effects along with conventional effects such as fades, dissolves, slow motion, etc., and a user can select any of the effects from the menu to apply to a segment of input video.

As a preliminary step in the method, a user can click on Load Video button 82 or otherwise instruct digital video effects device 50 to load input video 10. In accordance with the effects of elements that can include user interface (software) element 70 (FIG. 10), file system elements (not shown), etc., digital video effects device 50 can open a data file, load portions of input video 10 from a source such as data storage 60 into memory 64, or otherwise prepare input video 10 or an initial portion thereof for processing. In response to this user input, digital video effects device 50 causes the first frame (or other selected frame) of input video 10 to be displayed in video box 80. The GUI displays the number of frames that have been loaded (e.g., "205 frames loaded").

The user can then cause digital video effects device 50 to advance or step frame-by-frame through input video 10. For example, video effects device 50 can display the next frame each time the user clicks a right-hand button (not shown) on mouse 56 (FIG. 10). Likewise, the user can cause digital video effects device 50 to reverse or step backward through input video 10, displaying a previous frame each time the user clicks a left-hand button (not shown) on mouse 56. Note that this GUI feature for stepping frame-by-frame forward and backward through input video 10 is only exemplary, and that in other embodiments other mechanisms for navigating through input or output video can be provided. For example, a digital video effects device can include a knob device of the type sometimes referred to in the art as a jog and shuttle knob to move forward and backward through the input or output video.

In the exemplary embodiment, after the first frame (or other selected frame) of input video 10 is displayed in video box 80, the user advances input video 10 frame by frame until the user observes a portion of subject 20 (FIG. 1) appear. In the example of input video 10, which depicts a person tossing a ball (collectively referred to as subject 20) in his right hand as the person walks from left to right with respect to background 22, the user may, for example, observe a point of extremity on the person's extended right hand, such as a finger, become visible on the leftmost side of video box 80. The term "point of extremity" can be used to refer to the point on subject 20 that is farthest advanced or most extremely located in the direction of motion of subject 20. When the user observes this point of extremity of subject 20, the user steps input video in reverse until the frame before the point of extremity first appeared. Such an initial state is illustrated in FIG. 11A. Note in FIG. 11A that only background 22 is visible in video box 80, and no portion of subject 20 is yet visible.

Figure 11B:
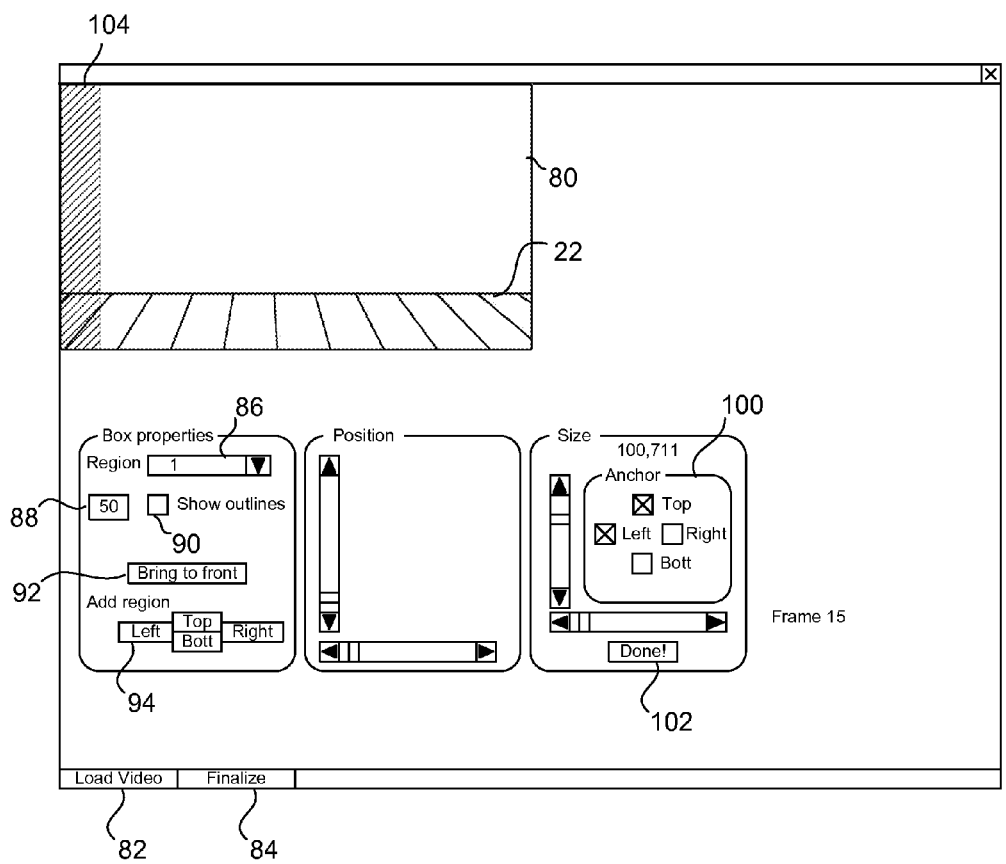
FIG. 11B is similar to FIG. 11A, showing a second step of an exemplary method of operation of the invention.

The user can then click on one of the Add Region buttons 94 to generate the first region. As illustrated in FIG. 11B, in response to this user input, digital video effects device 50 causes an elongated rectangular region graphic 104 to be displayed in video box 80. Region graphic 104 is shaded (e.g., colored red or another color) to enhance its contrast with the video frame displayed in video box 80 over which region graphic 104 is overlayed. Region graphic 104 is displayed in video box 80 at a location indicated by whichever one or more of Anchor checkboxes 100 are checked. For example, if the "Left" and "Top" Anchor checkboxes 100 are checked, digital video effects device 50 causes the top left corner of region graphic 104 to be located at the top left corner of video box 80. The user can adjust the position of region graphic 104 by moving region Position scrollbars 96 and can adjust the height and width of region graphic 104 by moving region Size scrollbars 98. If, for example, the "Top" and "Left" Anchor checkboxes 100 are checked, indicating that the top and left edges of region graphic 104 are anchored, adjusting the region size using region Size scrollbars 98 results in only the bottom or right edges of region graphic 104 moving while the top, left corner remains anchored. Note in the exemplary screen display shown in FIG. 11B that "100, 711" is displayed adjacent Anchor checkboxes 100 and region Size scrollbars 98 to indicate that region graphic 104 is 100 pixels in width and 711 pixels in height.

Figure 11C:
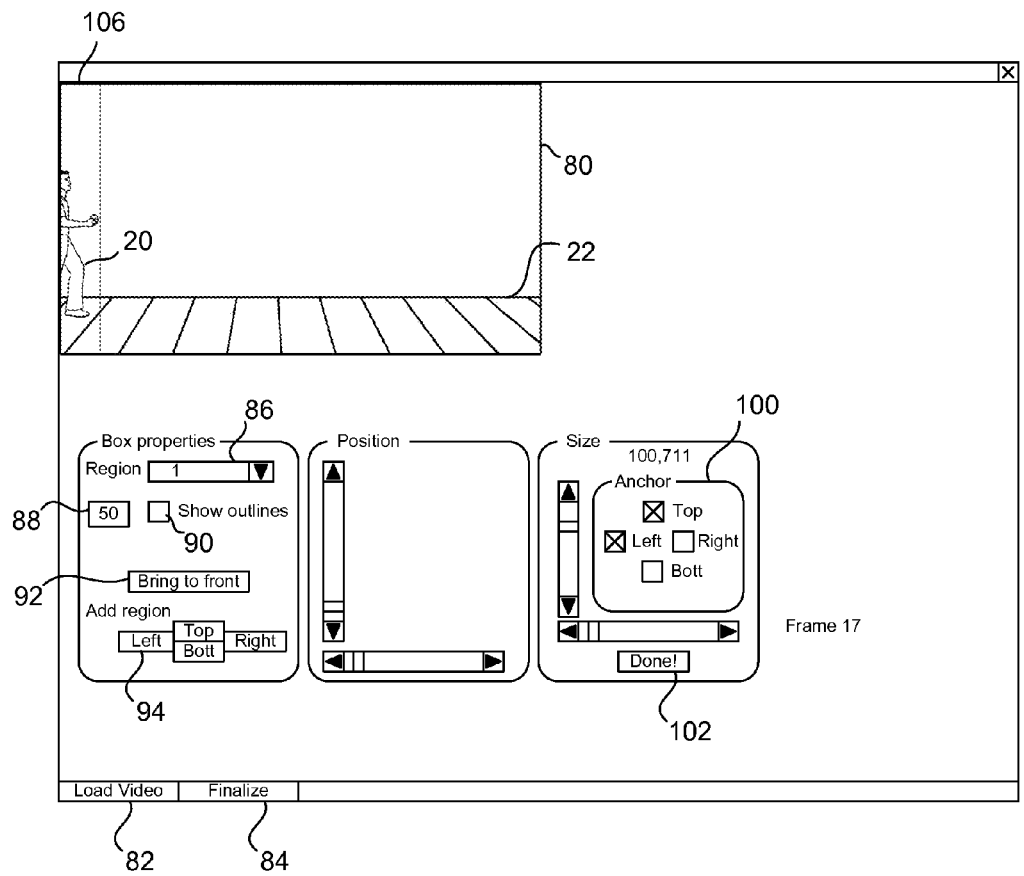
FIG. 11C is similar to FIGS. 11A-B, showing a third step of an exemplary method of operation of the invention.

When the user has added region graphic 104 and made any adjustments to its size, position, etc., that the user may desire, the user can click on the Done button 102. As illustrated in FIG. 11C, in response to this user input, digital video effects device 50 causes region graphic 104 to be replaced with a region 106 of input video 10. The user then advances input video 10 frame by frame in the manner described above while the user observes the above-referenced point of extremity of subject 20 appear, followed by more of subject 20. That is, as the user advances input video 10 frame by frame, the user observes subject 20 correspondingly advance from left to right across region 106. The user advances input video 10 in this manner until the user observes a point of extremity on subject 20 reach the right edge of region 106. The user stops advancing input video 10 at the frame just before that in which the point of extremity crosses the right edge of region 106. This state is illustrated in FIG. 11C. Note that the display of the number of frames loaded (e.g., "205 frames loaded") is replaced in this state with a display of the frame number of input video 10 that is then displayed in video box 80 (e.g., "Frame 17"). Also note that Region Number box 86 displays the number of the region that is then displayed (e.g., region "1" to indicate the first region). In addition, region frame count box 88 displays the number of the above-described region frames that are to be captured. For example, region frame count box 88 can display "50" to indicate that, to generate region 106 in the manner described above with regard to FIGS. 2-8, 50 region frames are to be captured from input video 10. Accordingly, in the exemplary embodiment, when the user clicks on one of Add Region buttons 94, digital video effects device 50 responds to this user input by not only displaying a new region graphic 104 (FIG. 11D) but also by capturing 50 region frames of input video 10, beginning at the then-displayed frame of input video 10. That is, in accordance with the effects of region capture (software) element 70 (FIG. 10), digital video effects device 50 copies a region-sized portion of each of the next 50 frames of input video 10, i.e., 50 region frames. For example, in an instance in which input video is of a bitmap format, and region 106 is 100 pixels in width and 711 pixels in height: an array of 100×711 pixels is copied from the then-displayed frame of input video 10 to become region frame $R_1F_1$ (where region 106 in this example is the 1st region $R_1$); a similar array of 100×711 pixels is copied from the next frame of input video 10 to become region frame $R_1F_2$; and so forth, until the 50th region frame of 100×711 pixels is copied from the 50th frame of input video 10 to become region frame $R_1F_{50}$. In the exemplary embodiment, digital video effects device 50, in accordance with region capture element 70 and region playback element 72, then causes the 50 captured region frames to be played back in region 106 in a continuous-loop manner As the captured region frames play back in region 106, subject 20 appears to appear at the left edge of region 106, to move across region 106, and to disappear at the right edge of region 106. Although in the exemplary embodiment playback in this manner begins as soon as the user clicks on one of Add Region buttons 94 to indicate that the region is ready for capture and that the user is ready to work on the next region, in other embodiments playback can be deferred until a later time.

If region 106 is too large, the user will observe subject 20 failing to fully move across region 106 within the timespan defined by the playback of the 50 captured (continuously looping) frames. It may appear, for example, that subject 20 disappears in mid-region. If the user observes such an undesired condition, the user can reduce the size of region 106 using region Size scrollbars 98. It should be noted that although for purposes of clarity regions 106, 108 etc., are depicted in FIGS. 11A-G as equal in size to each other, the width can vary somewhat from one region to another depending primarily upon variations in the subject's speed. For example, if all points on a subject were moving at a constant speed along a straight line from left to right, all regions would be the same width.

Figure 11D:
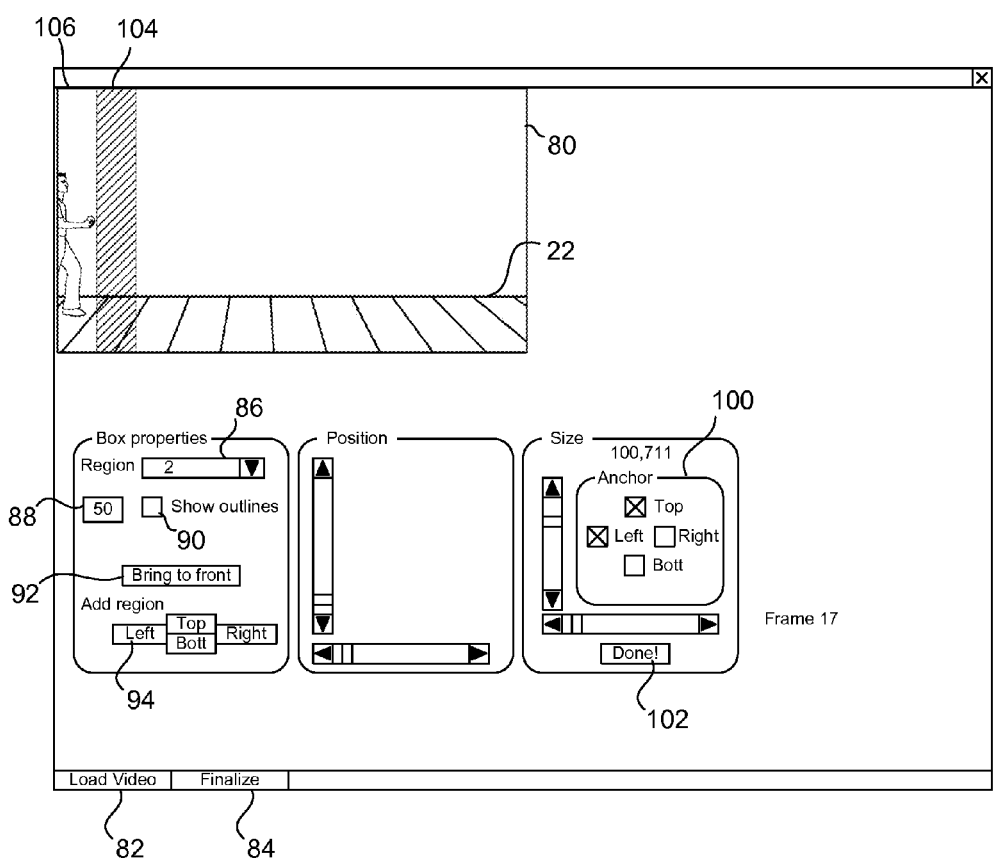
FIG. 11D is similar to FIGS. 11-C, showing a fourth step of an exemplary method of operation of the invention.

Digital video effects device 50 responds to the user clicking on one of Add Region buttons 94 by displaying the new region graphic 104 at a location indicated by the selected one of Region buttons 94. For example, if the user clicks on the "Right" Region button 94, the new region graphic 104 is displayed to the right of region 106, as illustrated in FIG. 11D. In an instance in which subject 20 appears to move in a direction from left to right across video box 80, each successive region can be placed to the right of the previous region, as in the example illustrated in FIGS. 11A-11G. However, in other instances, the subject may move in another direction. In such an instance, the user can instruct digital video effects device 50 to add the next region above the previous region by clicking the "Top" Region button 94, below the previous region by clicking the "Bottom" Region button 94, or even to the left of the previous region by clicking the "Left" Region button 94 (in an instance in which the motion of the subject appears to reverse direction). The user can add successive regions along the path of motion of the subject, to follow the subject as it moves around the scene. In this manner, the user can create regions that follow a subject not only along a path of motion from left to right, as in the straightforward example illustrated in FIGS. 11A-11G but also along more complex paths of motion that curve and change direction, such as in an instance in which the subject is a motocross or motorcycle rider on a course that curves left and right and undulates up and down. The user can also adjust region Position scrollbars 96 to ensure that a new region is positioned in a manner that follows the path of motion of the subject. When the user has added the new region graphic 104 and made any adjustments to its position that the user may desire, the user can click on the Done button 102, as described above. Furthermore, in some instances of following complex motion of a subject, two successive regions could overlap. In such an instance, the user can click on the Bring to Front box 92 to ensure that the region representing the subject's position at the later point in time is in front of the other region. Any portion of the region that is not in front will not be displayed and will be replaced by video (i.e., captured region frames) representing the region in front.

Figure 11E:
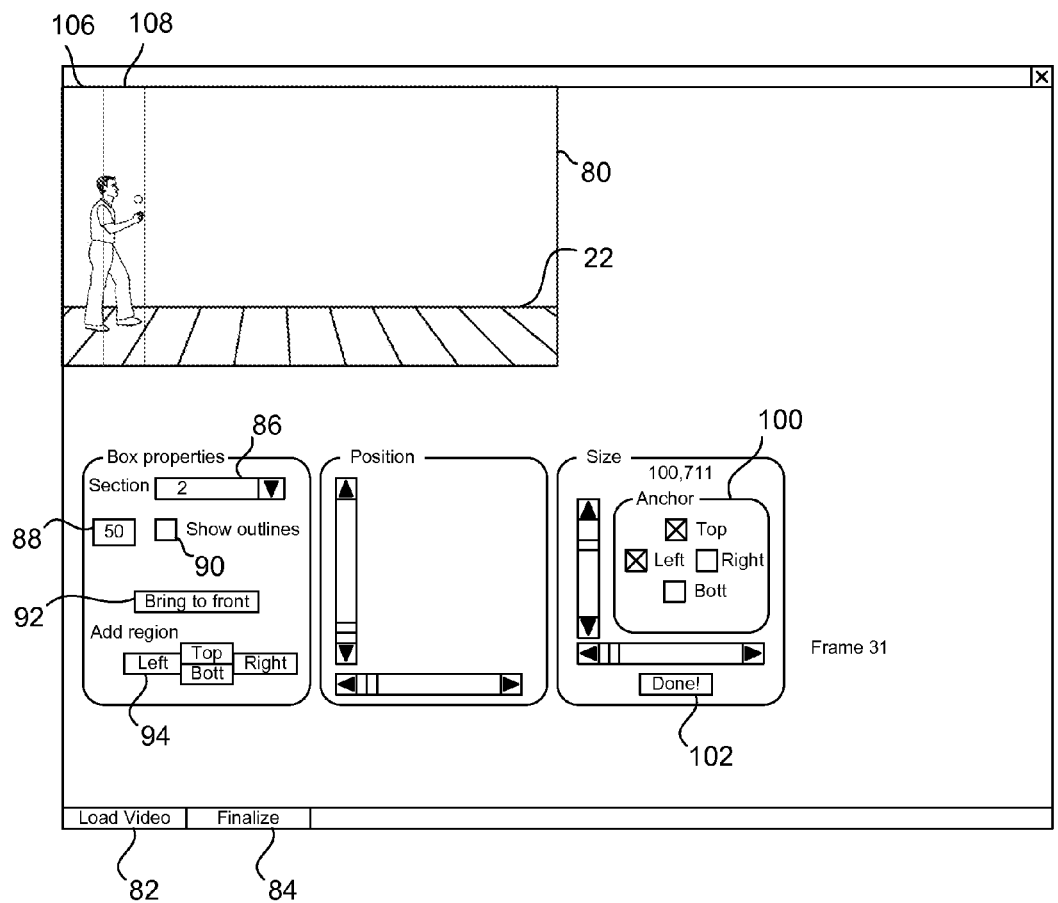
FIG. 11E is similar to FIGS. 11A-D, showing a fifth step of an exemplary method of operation of the invention.
Figure 11F:
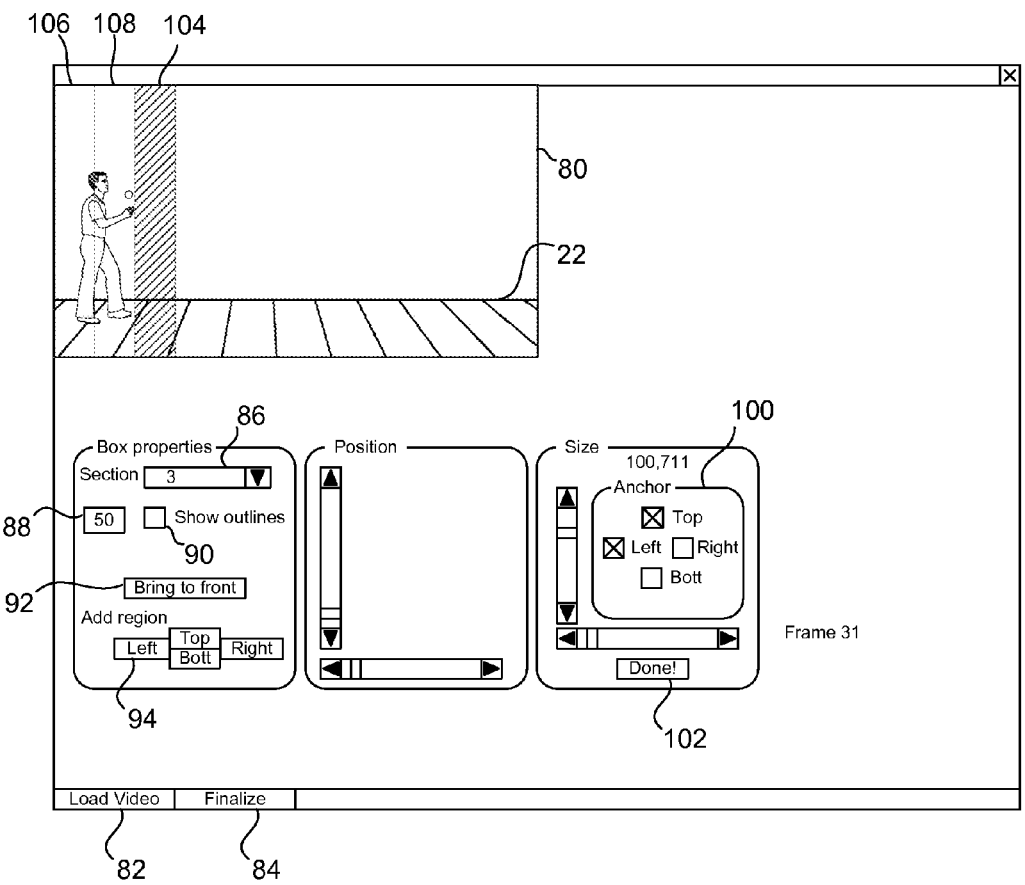
FIG. 11F is similar to FIGS. 11A-E, showing a sixth step of an exemplary method of operation of the invention.

Successively added regions are treated in the same manner as described above with regard to region 106. Thus, as illustrated in FIG. 11E, in response to the user having clicked on the Done button 102, digital video effects device 50 causes region graphic 104 to be replaced with a region 108 of input video 10. The user then advances input video 10 frame by frame in the manner described above while the user observes the above-referenced point of extremity of subject 20 cross from the right edge of region 106 into the left edge of adjacent region 108. The user continues to advance input video 10 frame by frame, as more of subject 20 moves from region 106 into region 108, until the user observes a point of extremity on subject 20 reach the right edge of region 108. The user stops advancing input video 10 at the frame just before that in which the point of extremity crosses the right edge of region 108. This state is illustrated in FIG. 11E. Note that the display indicates that "Frame 31" is the index number of the then-displayed frame of input video 10. Also note that Region Number box 86 indicates that region "2" is the index number of the newly added region 108. In this example, the user defines 13 regions or, in the nomenclature described above, M=13. It should be understood that there can be any suitable number of regions and captured region frames, and the 13 regions and 50 captured region frames described herein is intended only as an example.

When the user clicks on one of Add Region buttons 94, digital video effects device 50 responds to this user input by not only displaying a new region graphic 104 (FIG. 11F) but also by capturing the next 50 region frames from the next 50 frames of input video 10, beginning at the then-displayed frame of input video 10. In the same manner described above with regard to region 106, an array of pixels is copied from the then-displayed frame of input video 10 to become region frame $R_2F_1$ (where region 108 in this example is the 2nd region $R_2$); a similar array of pixels is copied from the next frame of input video 10 to become region frame $R_2F_2$; and so forth, until the 50th region frame of pixels is copied from a frame of input video 10 to become region frame $R_2F_{50}$. As described above with regard to region 106, digital video effects device 50, in accordance with region capture element 70 and region playback element 72, then causes the 50 captured region frames to be played back in region 108 in a continuous-loop manner As the captured region frames play back in regions 106 and adjacent region 108, subject 20 appears to appear at the left edge of region 106, move across region 106, and cross into region 108 at the right edge of region 106 (and the bordering left edge of region 108).

Figure 11G:
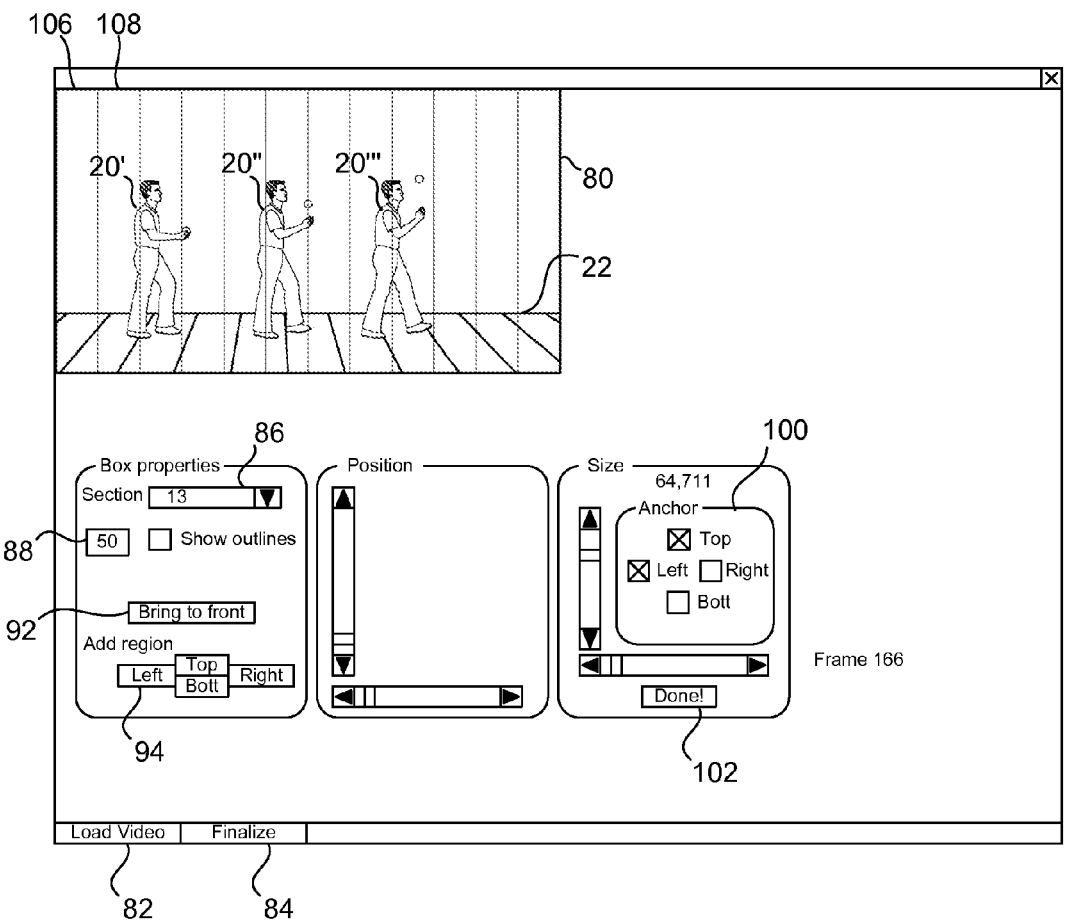
FIG. 11G is similar to FIGS. 11A-F, showing a seventh step of an exemplary method of operation of the invention.

Successively added regions are processed in the same manner as described above with regard to regions 106 and 108 until all regions (13 in this example) have been defined. In the exemplary embodiment, all regions have been defined when the adjacent regions 106, 108, etc., span the width of video box 80, as shown in FIG. 11G. In the exemplary embodiment, defining regions 106, 108, etc., in the manner described above defines corresponding regions for both input video 10 and output video 24 (FIG. 9). That is, frames of input video 10 are conceptually divided into the same regions as frames of output video 24. Note that when all regions have been defined, and when the sequence of (50 in this example) region frames defining video within each region have been captured and played back in video box 10 in a position corresponding to that region's location, what is displayed in video box 10 is the above-described output video 24. Importantly, note that when a sufficient number of regions have been defined and played back for the user, the user can observe that clones 20', 20", 20''', etc., of subject 20 appear to follow each other along the path of motion of subject 20 from one region into an adjacent region, as described above with regard to output video 24 shown in FIG. 9.

Although in the exemplary embodiment the user interface is used as described above to advance input video 10 frame by frame until the user observes a point of extremity of subject 20 reach an edge of a region, it can be noted that in other embodiments this operation and others described herein can be automated in whole or part. For example, well known image processing algorithms can be applied to discern subject 20 from background 22 and identify the frame of input video 10 in which a point of extremity of subject 20 reaches the edge of a region. Similarly, the entire operation of defining the regions can be automated. Accordingly, embodiments are contemplated in which input video 10 is transformed into output video 24 with minimal or no user input.

In the exemplary embodiment, the user can check the Show Outlines checkbox 90 to cause digital video effects device 50 to display a border (e.g., black solid line) around each region, as illustrated in FIG. 11G. Unchecking the Show Outlines checkbox 90 eliminates these border graphics and, correspondingly, the user's perception of the regions. Indeed, in embodiments of the type described above in which defining regions and other steps or operations are automated, a user need never be able to observe or otherwise perceive any graphics representing the regions. In such more automated embodiments, a user need not even be aware of the concept of regions.

With additional reference to FIGS. 3-7, in the exemplary embodiment the captured sequences 34, 36, 38, etc., can be stored in data storage 60 (FIG. 10) or, alternatively or in combination with data storage 60, in memory 64. In an instance in which there are 13 regions defined, with each captured sequence consisting of 50 region frames, and in which video data is stored in bitmap format, data structures can be defined in data storage 60, memory 64 or other suitable locations for storing 13 arrays of 50 bitmaps each, as indicated in FIG. 10. The data structures can be defined to facilitate playback of the captured sequences of region frames.

As described above, continuous-loop playback of the captured sequences of region frames occurs when digital video effects device 50, in accordance with the effects of region playback (software) element 74, reads the captured sequences of region frames from the above-described data structures or other locations in data storage 60, memory 64 or other source, and causes the region frames to be output on video display 52 (FIG. 10) in the video box 80. That is, digital video effects device 50 can read a captured region frame and cause that region frame (data) to be displayed in a location in video box 80 corresponding to the region. Thus, digital video effects device 50 can fill or build a frame of output video 24 in video box 80 in this manner by reading one region frame for each region, and then cause the frame of output video 24 to be displayed in video box 80.

Although in the exemplary embodiment capturing sequences 34, 36, 38, etc., occurs by reading region frame-sized portions of data from input video 10 and storing them in memory, and playback is providing by reading such region frames from the captured sequences stored in memory, in other embodiments playback can be provided by outputting the captured sequences of region frames directly, i.e., without an intermediate step of storing entire captured sequences in memory. For example, region frame-sized portions of data can be captured by reading them as described above from input video 10, processing them to place them in the appropriate locations in the stream of output video 24 for playback, and immediately played back as output video 24 by outputting the result to video display 52 or recording output video 24 on a storage medium.

In addition, in the exemplary embodiment the user can instruct digital video effects device 50 to record such output video 24 by clicking on "Finalize" button 84. In response to this user input, digital video effects device 50 can build each frame of output video 24 in the above-described manner and, instead of (or in addition to) causing the frame of output video 24 to be immediately output on video display 52 (FIG. 10), can cause the frame of output video 24 to be recorded in data storage 60 or provided to any other suitable location (e.g., recorded on a removable disk (not shown), exported to a remote device via network interface 62, etc.). In this manner, digital video effects device 50 can cause the stream or sequence of frames of output video 24 to be recorded or transmitted. Providing output video 24 by displaying it in video box 80 is useful to the user, but does not facilitate combining output video 24 with other video or distributing output video 24 to others who wish to view or use output video 24. Therefore, the user can instruct digital video effects device 50 to record or transmit output video 24 in a manner that can facilitate its use and dissemination to others. For example, once output video 24 has been created and recorded, the user (or another user using different video editing equipment) can incorporate it into a larger video production that includes other footage.

Figure 12:
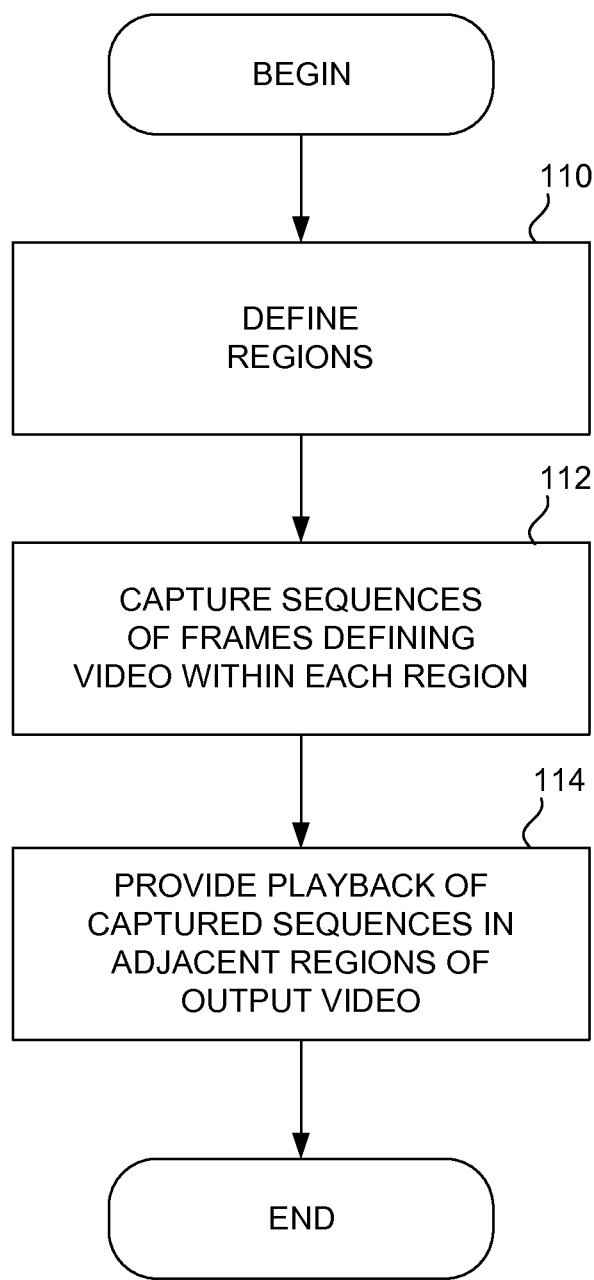
FIG. 12 is a flow diagram illustrating the exemplary method of operation.

The above-described method for providing the "continuous freeze-frame" digital video effect can be summarized with reference to the flow diagram of FIG. 12. As indicated by block 110, a plurality of adjacent regions in the input and output video are defined. The adjacent regions are defined so that they span a path of motion of the subject across the scene. Regions can be defined in any suitable manner, such as through the use of a user interface. As indicated by block 112, for each region, a plurality of sequential region frames defining video within the region are captured. Capturing the sequences of region frames can include storing them in memory, as described above with regard to the exemplary embodiment. Alternatively, in other embodiments frames can be placed into the processing stream for immediate playback in substantially real-time as they are captured. As indicated by block 114, for each region, playback of a captured sequence of region frames is provided in a substantially continuous loop. In providing playback, each region is positioned in the output video adjacent to or bordering the playback of the captured plurality of sequential frames defining video within an adjacent region in the output video. Providing playback can include building a recorded output video in a frame-by-frame manner and storing the output video for later use. Alternatively or in addition, providing playback can include outputting the output video to a display.

While one or more embodiments of the invention have been described as illustrative of or examples of the invention, it will be apparent to those of ordinary skill in the art that other embodiments are possible that are within the scope of the invention. For example, although in the above-described exemplary embodiment of the invention a user interface is used to define the regions and effect other operations, in other embodiments some or all operations can be automated and occur with minimal or no user input. Accordingly, the scope of the invention is not to be limited by such embodiments but rather is determined by the appended claims.

What is claimed is:

1. A method for providing a digital video effect, comprising:
   defining a plurality of adjacent regions in input video;
   defining a plurality of adjacent regions in output video based on the defined plurality of adjacent regions in input video;
   for each region of the plurality of adjacent regions in the input digital video, capturing a plurality of sequential frames defining video within the region; and
   for each region of the plurality of adjacent regions in the output video, providing playback of the captured plurality of sequential frames in a substantially continuous loop, where each of the continuous loops is positioned contiguously in the output video adjacent another continuous loop of an adjacent region in the output video.

2. The method claimed in claim 1, wherein:
   capturing the plurality of sequential frames defining video within the region comprises copying the plurality of sequential frames from an input video file to a data structure stored in a digital video effects device memory;
   providing playback of the captured plurality of sequential frames in a substantially continuous loop comprises copying the captured sequential frames stored in the data structure to an output video file.

3. The method claimed in claim 1, wherein capturing a plurality of sequential frames comprises:

detecting movement of a subject depicted in the input video; and identifying the plurality of sequential frames defining video within the region in response to movement of the subject within the region.

4. The method claimed in claim 3, wherein:

detecting movement of a subject depicted in the input video comprises detecting a frame depicting a transition of the subject from a first region into a second region adjacent the first region; and identifying the plurality of sequential frames defining video within the region comprises identifying a sequence of frames beginning at the frame depicting the transition of the subject from the first region into the second region.

5. The method claimed in claim 4, wherein detecting a frame depicting a transition of the subject from a first region into a second region adjacent the first region comprises an operator using a digital video effects device to advance the input video frame by frame until the operator identifies a frame in which the subject is about to transition from the first region into the second region and then inputting to the digital video effects device a first transition indication.

6. The method claimed in claim 5, wherein:

capturing the plurality of sequential frames defining video within the region comprises copying the plurality of sequential frames from an input video file to a data structure stored in a digital video effects device memory;

providing playback of the captured plurality of sequential frames in a substantially continuous loop comprises copying the captured sequential frames stored in the data structure to an output video file.

7. The method claimed in claim 1, wherein the adjacent regions of the output video is divided similarly to the defined adjacent regions of the input video.

8. A computer program product for providing a digital video effect, the computer program product comprising a non-transitory computer readable medium on which is stored in computer executable form instructions for, when executed on a digital video effects device, causing the digital video effects device to:

define a plurality of adjacent regions in input video;

define a plurality of adjacent regions in output video based on the defined plurality of adjacent regions in input video;

for each region of the plurality of adjacent regions in the input digital video, capture a plurality of sequential frames defining video within the region; and for each region of the plurality of adjacent regions in the output video, provide playback of the captured plurality of sequential frames in a substantially continuous loop, where each of the continuous loops is positioned contiguously in the output video adjacent another continuous loop of an adjacent region in the output video.

9. The computer program product claimed in claim 8, wherein:

the plurality of sequential frames defining video within the region are captured by copying the plurality of sequential frames from an input video file to a data structure stored in a digital video effects device memory;

playback of the captured plurality of sequential frames in a substantially continuous loop is provided by copying the captured sequential frames stored in the data structure to an output video file.

10. The computer program product claimed in claim 8, wherein a plurality of sequential frames are captured by:

detecting movement of a subject depicted in the input video; and contributing to identification of the plurality of sequential frames defining video within the region in response to movement of the subject within the region.

11. The computer program product claimed in claim 10, wherein:

movement of a subject depicted in the input video is detected by contributing to detecting a frame depicting a transition of the subject from a first region into a second region adjacent the first region; and identification of the plurality of sequential frames defining video within the region is contributed to by contributing to identifying a sequence of frames beginning at the frame depicting the transition of the subject from the first region into the second region.

12. The computer program product claimed in claim 11, wherein contributing to detecting a frame depicting a transition of the subject from a first region into a second region adjacent the first region includes receiving user input indicating an operator using the digital video effects device to advance the input video frame by frame until the operator identifies a frame in which the subject is about to transition from the first region into the second region.

13. The computer program product claimed in claim 12, wherein:

the plurality of sequential frames defining video within the region are captured by copying the plurality of sequential frames from an input video file to a data structure stored in a digital video effects device memory;

playback of the captured plurality of sequential frames in a substantially continuous loop is provided by copying the captured sequential frames stored in the data structure to an output video file.

14. A digital effects device for providing a digital video effect, comprising:

a user interface comprising a display screen and one or more user input devices; and a processor system, comprising one or more processors and associated memory, the processor system executing instructions stored in the associated memory to:

define a plurality of adjacent regions in input video;

define a plurality of adjacent regions in output video based on the defined plurality of adjacent regions in input video;

for each region of the plurality of adjacent regions in the input digital video, capture a plurality of sequential frames defining video within the region; and for each region of the plurality of adjacent regions in the output video, provide playback of the captured plurality of sequential frames in a substantially continuous loop, where each of the continuous loop is positioned contiguously in the output video adjacent another continuous loop of an adjacent region in the output video.

15. The digital effects device claimed in claim 14, wherein:

the plurality of sequential frames defining video within the region are captured by copying the plurality of sequential frames from an input video file to a data structure stored in a digital video effects device memory;

playback of the captured plurality of sequential frames in a substantially continuous loop is provided by copying the captured sequential frames stored in the data structure to an output video file.

16. The digital effects device claimed in claim 14, wherein a plurality of sequential frames are captured by:

detecting movement of a subject depicted in the input video; and contributing to identification of the plurality of sequential frames defining video within the region in response to movement of the subject within the region.

17. The digital effects device claimed in claim 16, wherein:
movement of a subject depicted in the input video is detected by contributing to detecting a frame depicting a transition of the subject from a first region into a second region adjacent the first region; and
identification of the plurality of sequential frames defining video within the region is contributed to by contributing to identifying a sequence of frames beginning at the frame depicting the transition of the subject from the first region into the second region.

18. The digital effects device claimed in claim 17, wherein contributing to detecting a frame depicting a transition of the subject from a first region into a second region adjacent the first region includes receiving user input indicating an operator using the digital video effects device to advance the input video frame by frame until the operator identifies a frame in which the subject is about to transition from the first region into the second region.

19. The digital effects device claimed in claim 18, wherein:
the plurality of sequential frames defining video within the region are captured by copying the plurality of sequential frames from an input video file to a data structure stored in a digital video effects device memory;
playback of the captured plurality of sequential frames in a substantially continuous loop is provided by copying the captured sequential frames stored in the data structure to an output video file.

20. The digital effects device claimed in claim 14, wherein the adjacent regions of the output video is divided similarly to the defined adjacent regions of the input video.

* * * * *